United States Patent
Bellini (10) Patent No.: US 10,723,283 B1
(45) Date of Patent: Jul. 28, 2020

(54) CARGO LOADING AND UNLOADING SYSTEM IN A VEHICLE

(71) Applicant: Gonzalo Bellini, Miami, FL (US)

(72) Inventor: Gonzalo Bellini, Miami, FL (US)

( * ) Notice: Subject to any disclaimer, the term of this patent is extended or adjusted under 35 U.S.C. 154(b) by 15 days.

(21) Appl. No.: 16/282,728

(22) Filed: Feb. 22, 2019

(51) Int. Cl.
*B60R 13/01* (2006.01)
*B60R 5/04* (2006.01)

(52) U.S. Cl.
CPC .............. *B60R 13/01* (2013.01); *B60R 5/041* (2013.01); *B60R 2013/018* (2013.01)

(58) Field of Classification Search
CPC ....... B60R 5/041; B60R 13/01; B60R 13/011; B60R 13/013; B62D 33/02
USPC .................................... 296/26.09, 37.6, 39.2
See application file for complete search history.

(56) References Cited

U.S. PATENT DOCUMENTS

| | | | | |
|---|---|---|---|---|
| 4,305,695 A | * | 12/1981 | Zachrich | B60P 1/00 296/37.1 |
| 5,584,524 A | * | 12/1996 | Vogel | B60R 13/01 224/401 |
| 5,810,415 A | * | 9/1998 | Vogel | B60R 13/01 296/39.1 |
| 8,840,166 B1 | | 9/2014 | Derbes et al. | |
| 9,545,865 B2 | * | 1/2017 | Lindgren | B60P 1/003 |
| 2015/0125256 A1 | * | 5/2015 | Bemis | B60P 1/00 414/809 |
| 2019/0106063 A1 | * | 4/2019 | Briggs | B60R 13/01 |

FOREIGN PATENT DOCUMENTS

GB        2414724        12/2007

* cited by examiner

*Primary Examiner* — Jason S Daniels
(74) *Attorney, Agent, or Firm* — Sanchelima & Associates, P.A.; Christian Sanchelima; Jesus Sanchelima (57) ABSTRACT

The present invention is a cargo loading and unloading system for a vehicle that facilitates easy loading and unloading of cargos by a simple, compact, flexible and long-lasting structure. Cargo loading and unloading system for a vehicle includes a mat, at least one front longitudinal member, at least one rear longitudinal member and at least one cross member. Mat is disposed on a surface of cargo storage area. Longitudinal members are disposed longitudinally on mat. Cross members are disposed transverse to longitudinal members on mat such that longitudinal members and cross members form a frame. The rear and front longitudinal members are in connection with mat and slides-in and slides-out mat on surface such that when slid out, cargo being loaded and unloaded and when slid in, cargo is transported.

8 Claims, 8 Drawing Sheets

CARGO LOADING AND UNLOADING SYSTEM IN A VEHICLE

BACKGROUND OF THE INVENTION

1. Field of the Invention

The present disclosure relates to loading and unloading of cargos. More particularly, the present disclosure relates to a cargo loading and unloading system for use with a vehicle.

2. Description of the Related Art

Loading and unloading cargos from cargo storage areas or tailgates of vehicles is a troublesome task for many due to limited accessibility to load by pushing-in and unload by pulling-out cargos until the end wall of cargo storage areas. Hence, there is a need for a cargo loading and unloading system that minimizes hassles of loading and unloading efforts.

Several designs for various cargo loading and unloading systems have been designed in the past. None of them, however, include a cargo loading and unloading system that is simple in structure, easy to operate, convertible in a compact form when not in use and easy to assemble and disassemble.

Applicant believes that a related reference corresponds to a GB patent application 2414724 filed by SPELLER GARY PHILIP for a flexible mat for use under pallets to aid in loading and unloading. The SPELLER GARY PHILIP reference discloses a mat for facilitating the loading and unloading of pallets into and out of spaces having restricted access. However, the mat includes a flexible strip extending along one edge of the mat which makes the structure complex and difficult to operate. Also, the flexible strip is not durable and would be required to be periodically replaced.

Another related application is U.S. Pat. No. 8,840,166 by SlideLiner LLC for a slidable cargo area floor liner and cargo management device. The patent application 8840166 discloses a substantially flat and ridged sheet of material having substantially rectangular dimensions so that the width of the device allows it to slide in and out of the vehicle cargo area between the wheel wells of the vehicle. However, providing spaced opening may not provide effective sliding while pushing cargo in the vehicle.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a cargo loading and unloading system for a vehicle that facilitates easy loading and unloading of cargos by a simple, flexible and long-lasting structure.

It is another object of the present invention to provide a cargo loading and unloading system for a vehicle that includes a mat and at least one front longitudinal member and at least one cross member and at least one rear longitudinal member that easily clings to the mat while loading and unloading and are easily removable for the folding mat and holding mat in a rolled form.

It is still another object of the present invention to provide a cargo loading and unloading system for a vehicle that is instantaneously configured to accommodate cargos of different configurations.

It is yet another object of the present invention to provide a cargo loading and unloading system for a vehicle that is easily handled by an individual.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Referring now to the drawings, FIGS. 1-8, where the present invention is generally referred to with numeral 10, it can be observed that a cargo loading and unloading system, in accordance with one embodiment, is provided for a cargo storage area 20 of a vehicle 30 that mainly includes a mat 40, at least one front longitudinal member 50, at least one cross member, i.e. rear and/or front cross members 60*a* and 60*b* and at least one rear longitudinal member 70.

Mat 40 can be a longitudinal mat and size and width can be selected in accordance with the size of the cargo storage area 20. As the cargo storage area can differ from one vehicle to another, mat 40 can be made available in various sizes and one can select mat 40 based on the type of vehicle. Mat 40 can be defined with a base surface with low friction and an upper surface of high friction. The low friction of base surface of mat 40 enables smooth sliding-in and sliding-out of mat 40. The high friction of upper surface prevents movement of cargos loaded thereon and also helps adherence of at least one front longitudinal member 50, rear and front cross members 60a and 60b and at least one rear longitudinal member 70 thereon. Shape of mat 40 can also be changed according to the needs. As illustrated in Figures, shape of mat 40 can be T-shape, however, other shapes or combination of shapes can be configured based on the shape of cargo storage area.

The at least one front longitudinal member 50 can be positioned longitudinally on mat 40. As illustrated in FIGS. 1 to 7, mat 40 can be T-shape and said at least one front longitudinal member 50 can be provided in below vertical portion 40a of T-shape. The at least one front longitudinal member 50 can be of any shape which have flat base. As illustrated, at least one front longitudinal member 50 can be square in shape of which base of square can be provided with a hook and loop fastener 90 so that at least one front longitudinal member 50 can be adhered to and detached from mat 40. At least one front longitudinal member 50 can be made of aluminum, plastic or other like materials. Hence, the life of at least one front longitudinal member 50 is greater, making it durable. The number of at least one front longitudinal member 50 can be increased or decreased as required so that mat 40 can be partitioned to systematically organize cargos thereon.

Rear and front cross members 60a and 60b are positioned horizontally on mat 40. Front cross member 60b is smaller in size than rear cross member 60a as the front cross member 60b has to move in and out between the protrusions 95 of wheels. Hence, the size of front cross member 60b should be selected such that it passes through protrusions 95 on either side. As illustrated in FIGS. 1 to 7, mat 40 can be T-shape and rear and front cross members 60a and 60b are also provided in below vertical portion 40a of T-shape. Rear and front cross members 60a and 60b can be of any shape which have flat base. As illustrated, rear and front cross members 60a and 60b can be square in shape of which base of square can be provided with a hook and loop fastener 90 so that rear and front cross members 60a and 60b can be adhered to and detached from mat 40. Rear and front cross members 60a and 60b can be made of aluminum, plastic or other like materials. Hence, the life of rear and front cross members 60a and 60b is greater, making it durable. Number of rear and front cross members 60a and 60b can be increased or decreased as required so that mat 40 can be partitioned to systematically organize cargos thereon.

At least one rear longitudinal member 70 can be positioned vertically on mat 40. As illustrated in FIGS. 1 to 7, mat 40 can be T-shape and at least one rear longitudinal member 70 can be provided in above horizontal portion 40b of T-shape. At least one rear longitudinal member 70 can be of any shape. As illustrated, at least one rear longitudinal member 70 can be square in shape adhered to and detached from mat 40. At least one rear longitudinal member 70 can be made of aluminum, plastic or other like materials. Hence, the life of at least one rear longitudinal member 70 is greater, making it durable. The number of at least one rear longitudinal member 70 can be increased or decreased as required so that mat 40 can be easily and comfortably pulled to slide-out and pushed to slide-in.

In one embodiment, at least one rear longitudinal member 70, holes 80 are configured on mat 40 so that a user (not illustrated in Figures) can insert hands to pull and push mat 40. In another embodiment, at least one rear longitudinal member 70 as well as holes 80 can be provided for a mat.

Providing a hook and loop fastener 90 for at least one front longitudinal member 50, rear and front cross members 60a and 60b and at least one rear longitudinal member 70 eases and quickens the process of adhering to and removing at least one front longitudinal member 50, rear and front cross members 60a and 60b and at least one rear longitudinal member 70 from mat 40. Also, it helps assembling and dismantling of at least one front longitudinal member 50, rear and front cross members 60a and 60b and at least one rear longitudinal member 70 to form any desired configuration based on cargo requirements without much effort. Though the present disclosure is described by providing a hook and loop fastener 90 for assembling and disassembling at least one front longitudinal member 50, rear and front cross members 60a and 60b and at least one rear longitudinal member 70 with mat 40, however other connection elements can be provided which allow ease of assembling and disassembling at least one front longitudinal member 50, rear and front cross members 60a and 60b and at least one rear longitudinal member 70 with mat 40. For instance, the portioning members at least one front longitudinal member 50, rear and front cross members 60a and 60b, and at least one rear longitudinal member 70 can be mounted to the mat using snap buttons or any other fastening means. Additionally, rear and front cross members 60a and 60b can be handedly mounted to at least one rear longitudinal member 70. At least one rear longitudinal member 70 can also be used as partitions to organize cargo.

Figure 1:
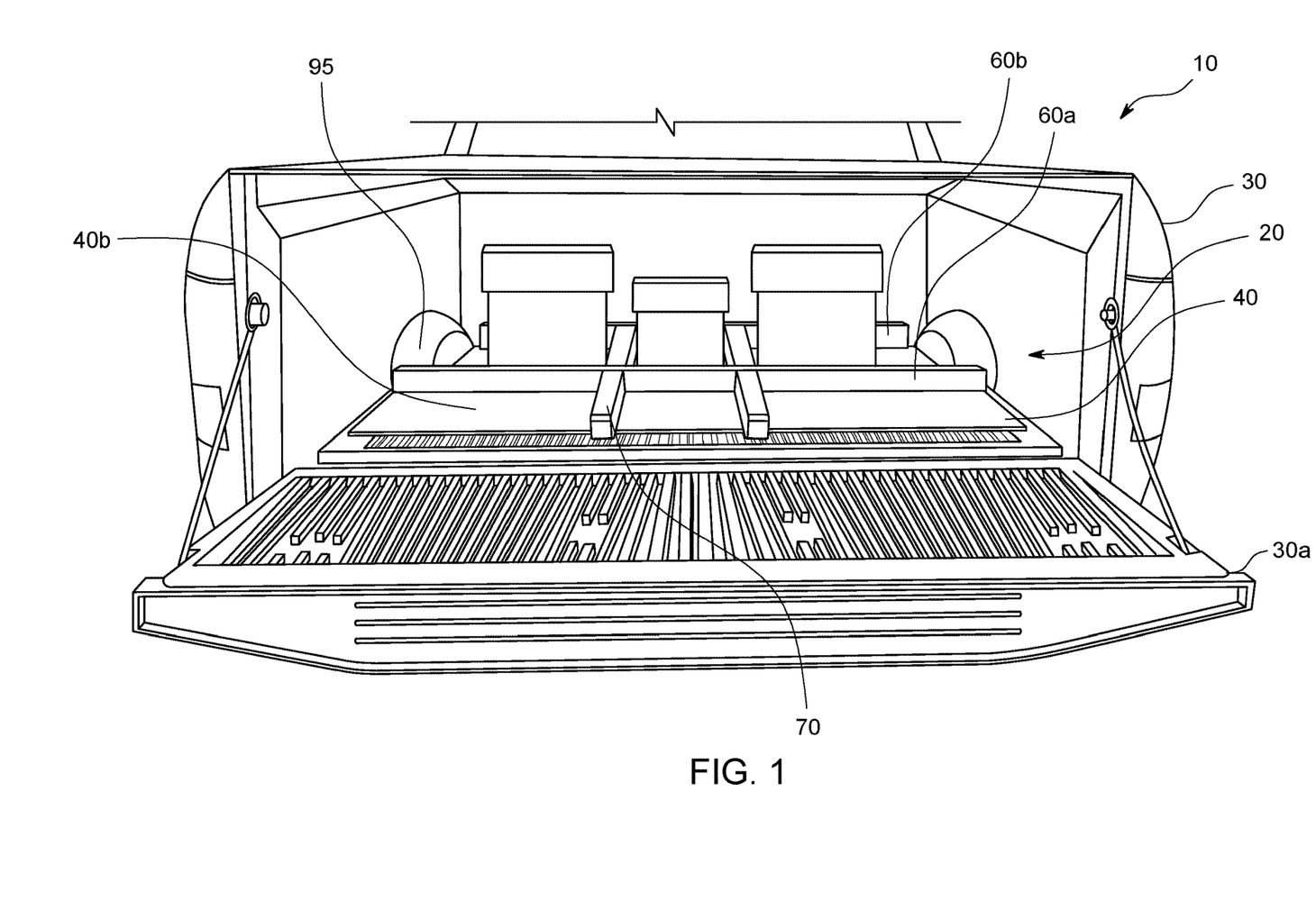
FIG. 1 represents a perspective view of a cargo loading and unloading system 10 positioned interior to reach the rear end of a cargo storage area 20 of a vehicle 30 and the back door of vehicle 30 is free for closing or for pulling out the system 10.
Figure 2:
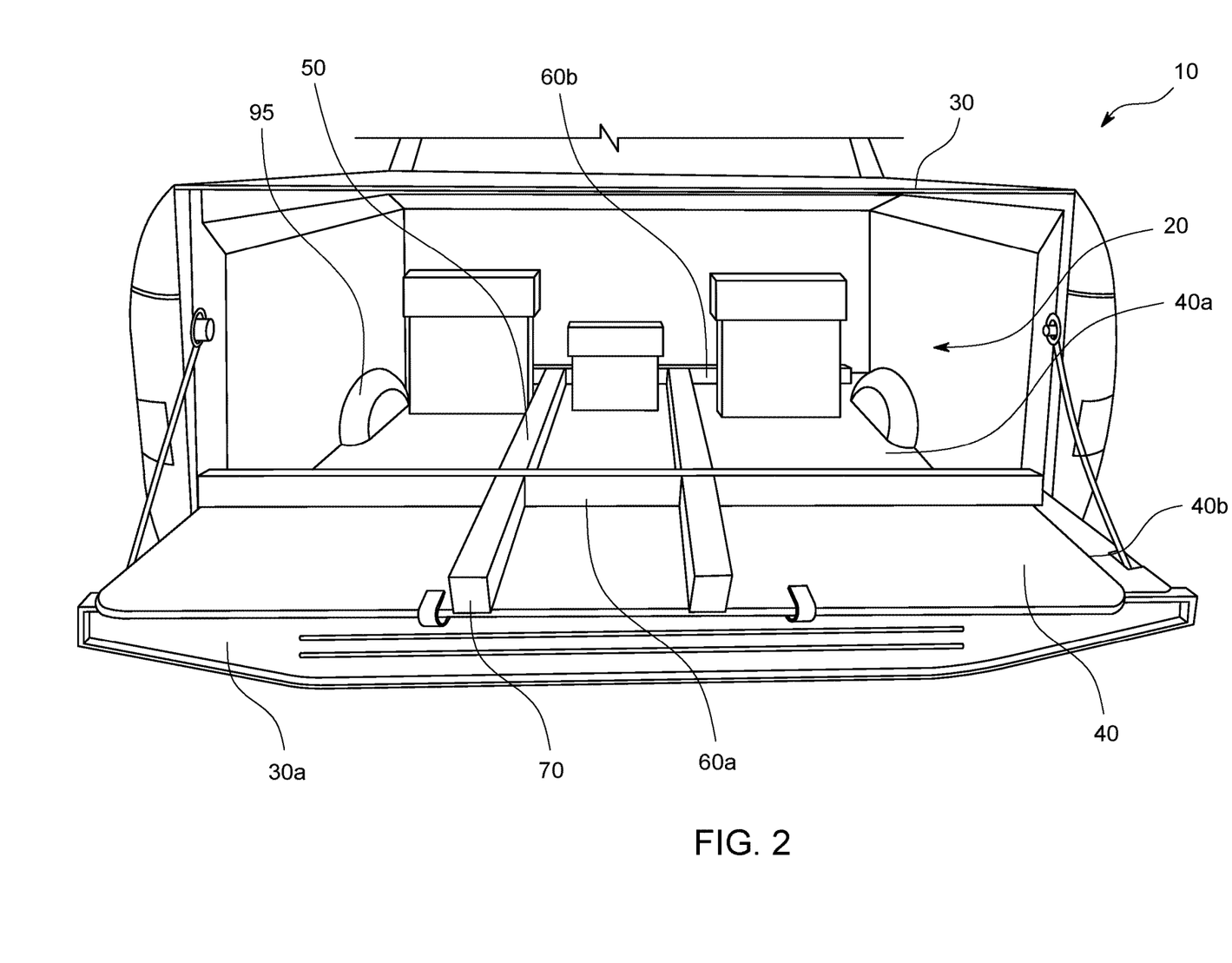
FIG. 2 represents a perspective view of cargo loading and unloading system 10 illustrating a mat 40 with at least one rear longitudinal member 70 attached for pushing in and pulling out mat 40. At least one front longitudinal member 50 and rear and front cross members 60*a* and 60*b* are also positioned forming a frame.
Figure 3:
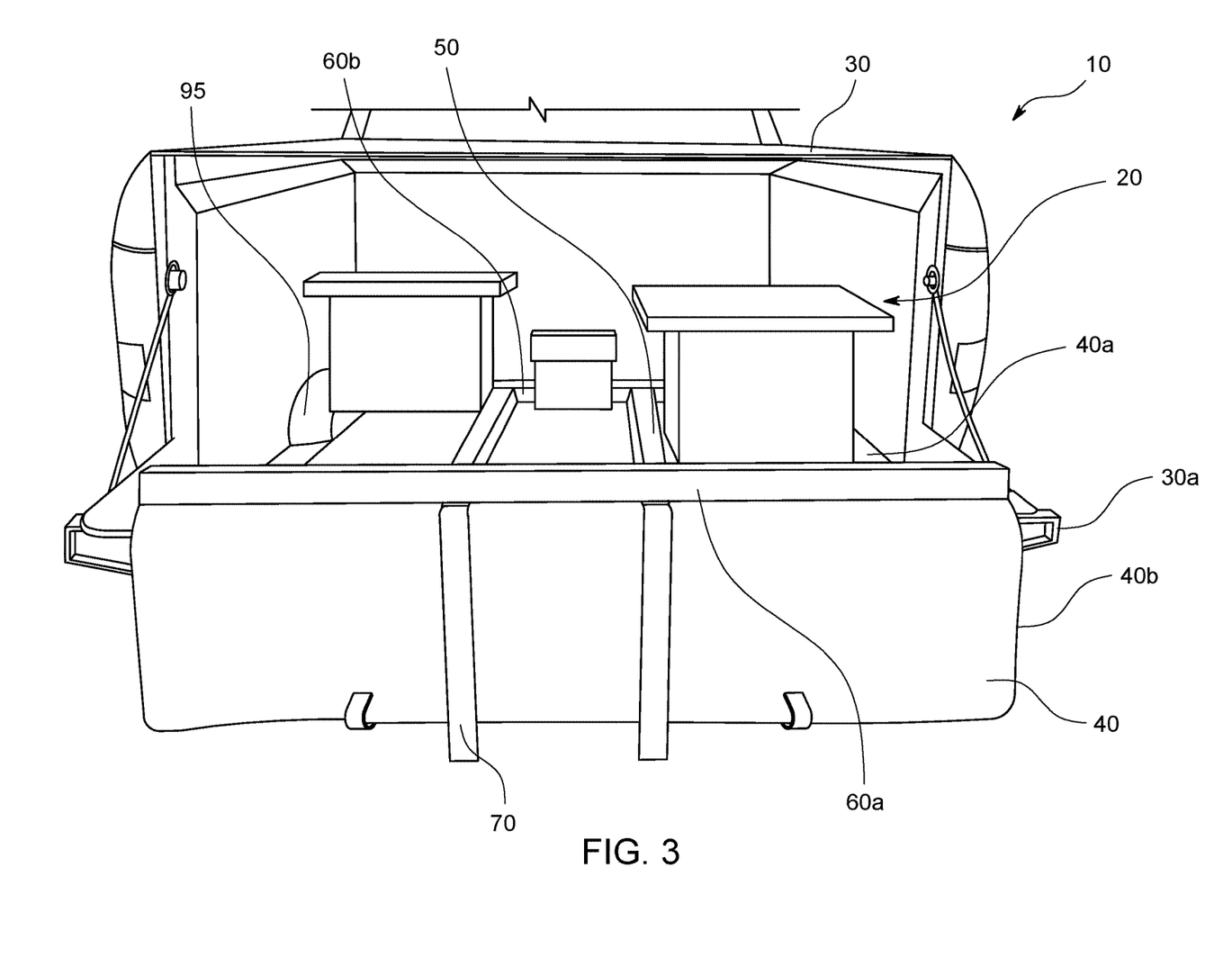
FIG. 3 represents a perspective view of a partial portion of mat 40 hanging down from the back door so that cargos can be loaded and unloaded at the distal end of mat 40.
Figure 4:
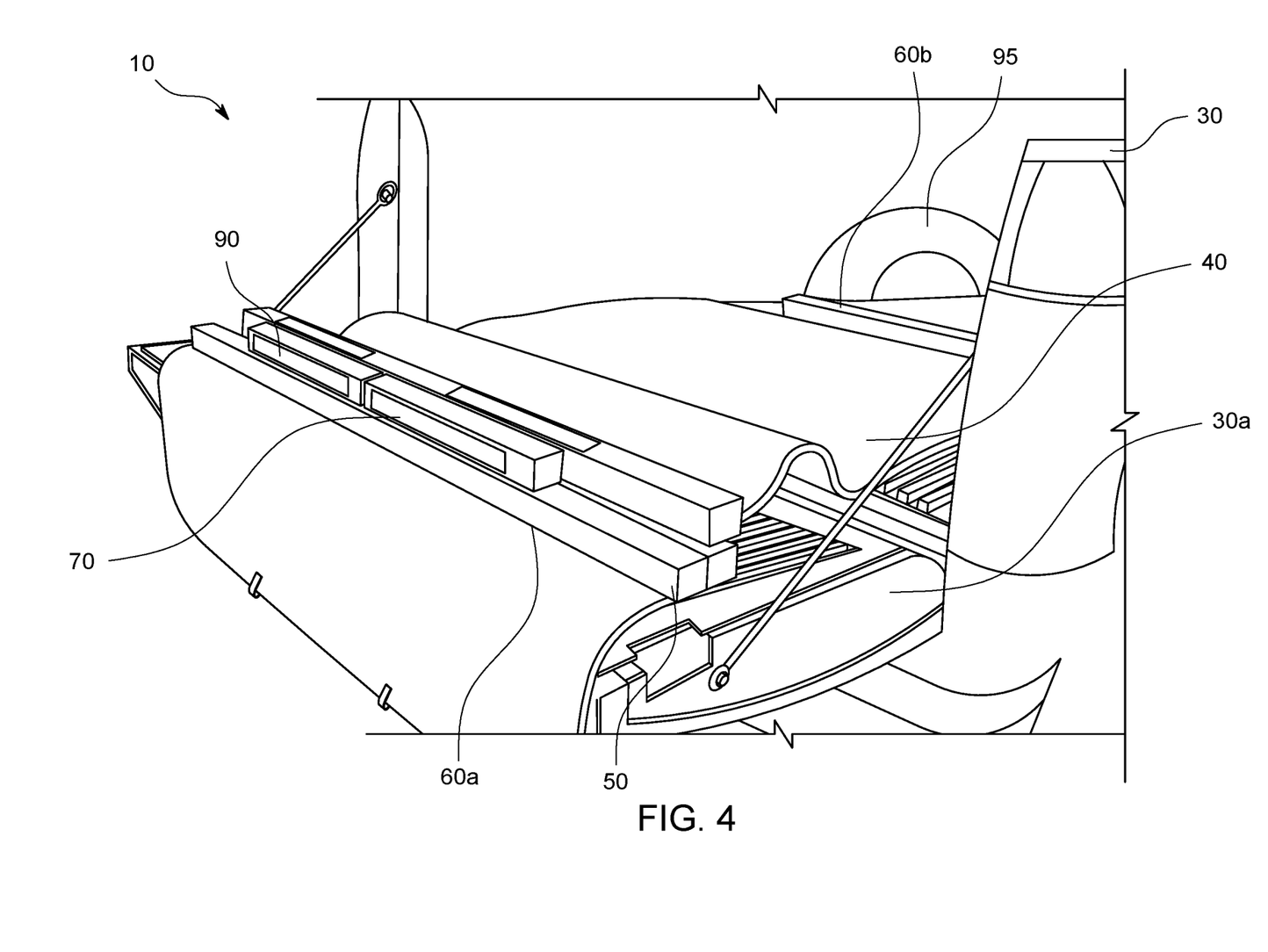
FIG. 4 represents a perspective view of disassembled at least one front longitudinal member 50 and rear and front cross members 60*a* and 60*b* and at least one rear longitudinal member 70 arranged in-line and on one another for performing rolling operation of mat or as viewed after unrolling of mat 40. The hook and loop fastener 90 is visible on at least one front longitudinal member 50 and rear and front cross members 60*a* and 60*b* and at least one rear longitudinal member 70.
Figure 5:
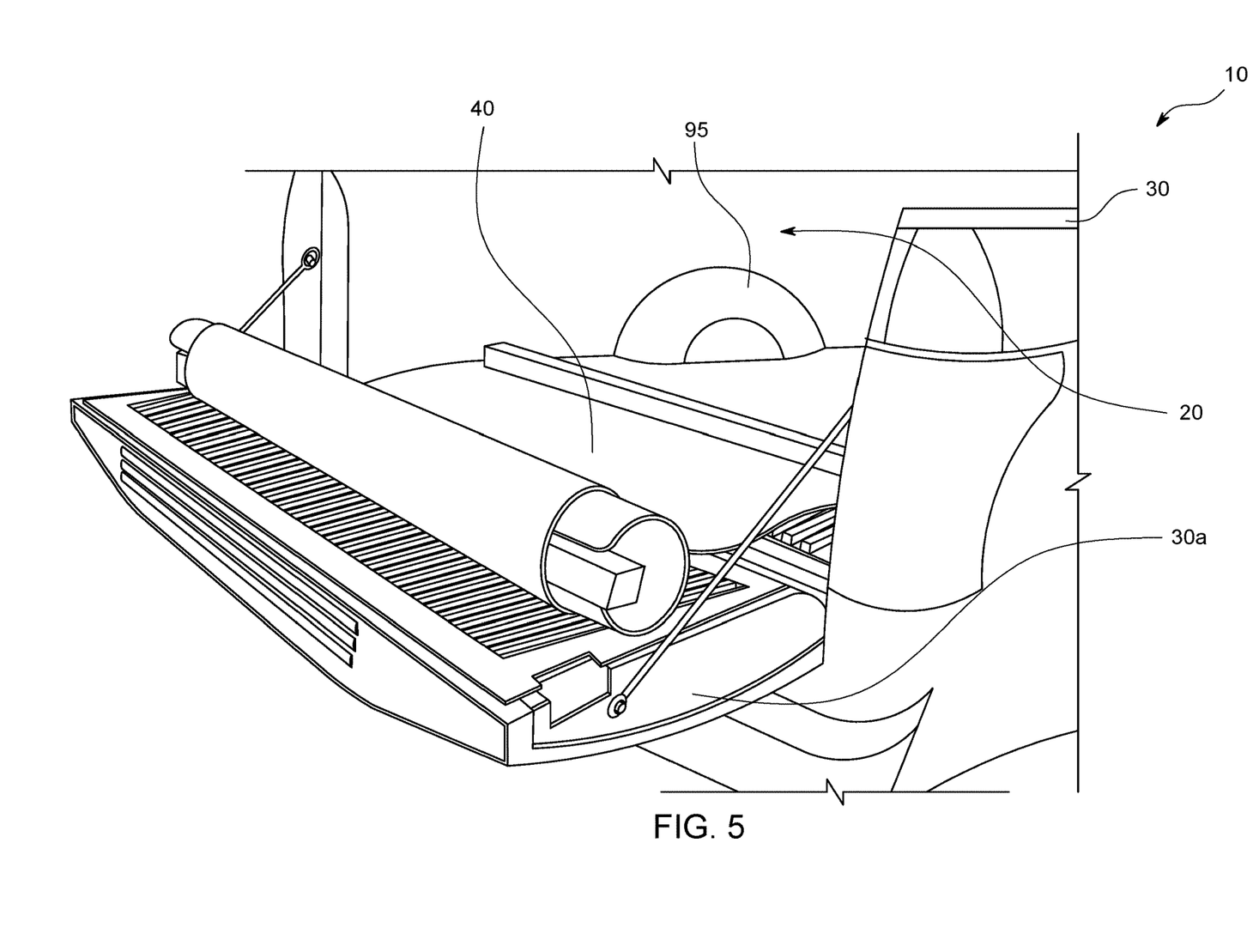
FIG. 5 represents a perspective view of mat 40 partially rolled and partially unrolled.
Figure 6:
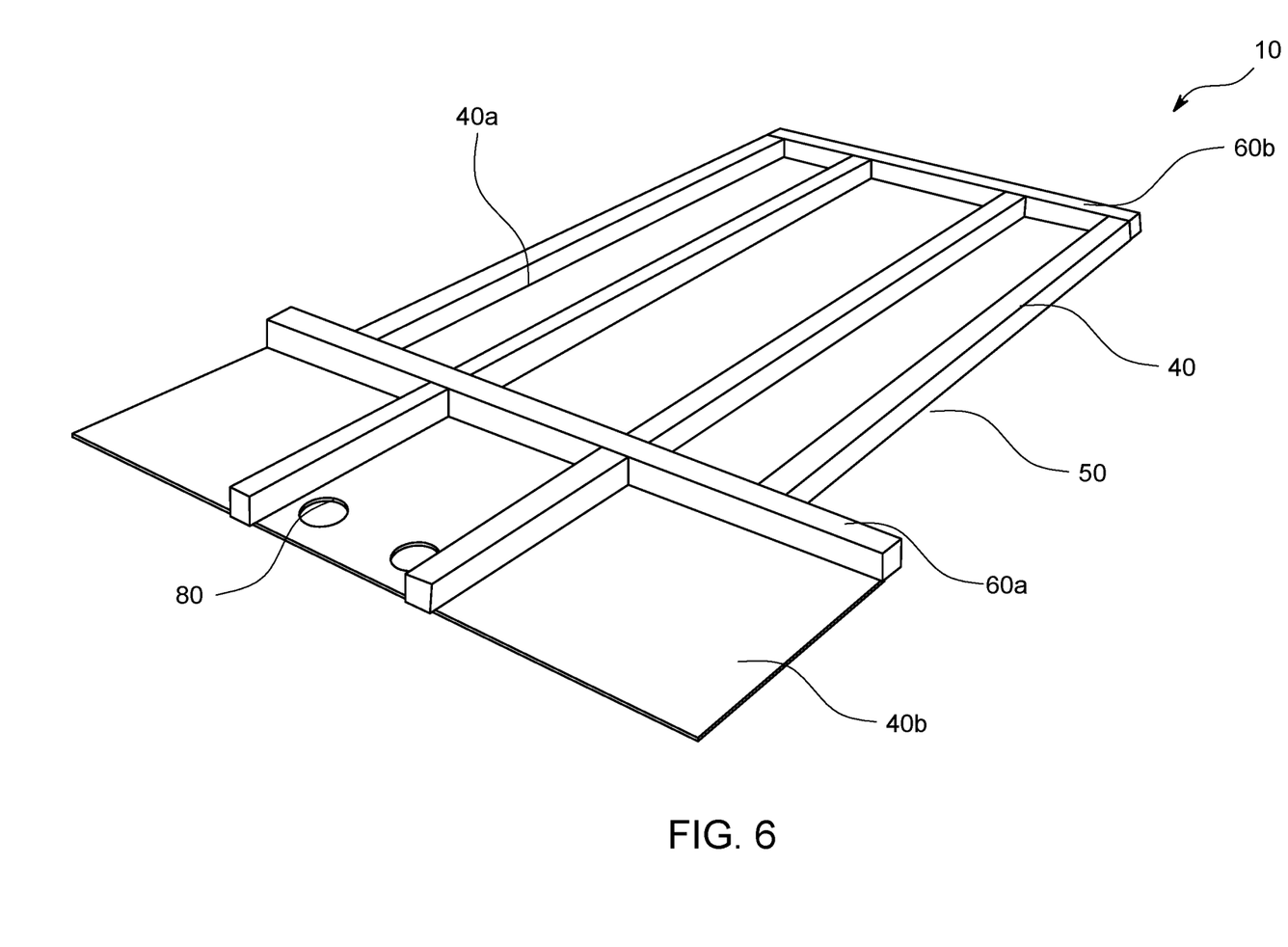
FIG. 6 represents a perspective view of cargo loading and unloading system 10 depicting mat 40, at least one front longitudinal member 50 and rear and front cross members 60*a* and 60*b* and at least one rear longitudinal member 70.
Figure 7:
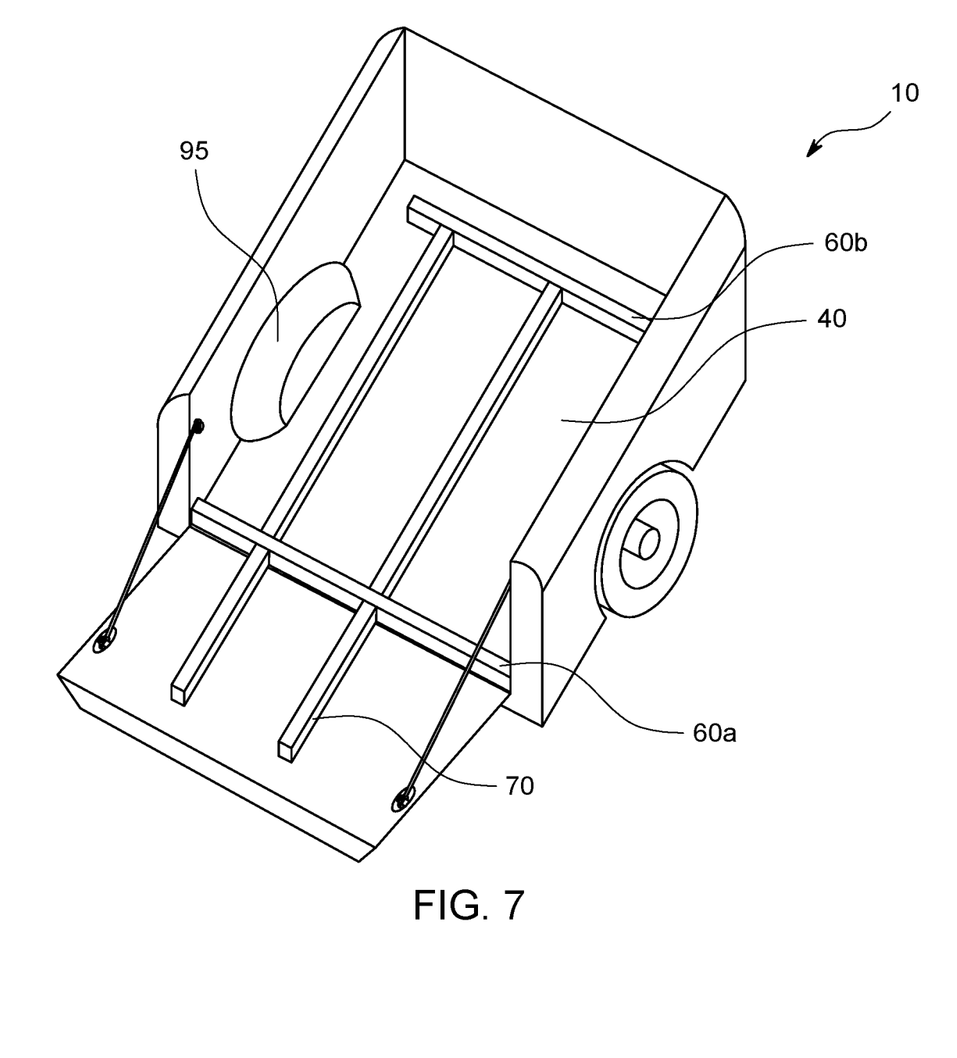
FIG. 7 represents a perspective view of cargo loading and unloading system 10 wherein front cross member 60*b* is small in size such that front cross member 60*b* can move between protrusions 95 of wheels from either side.
Figure 8:
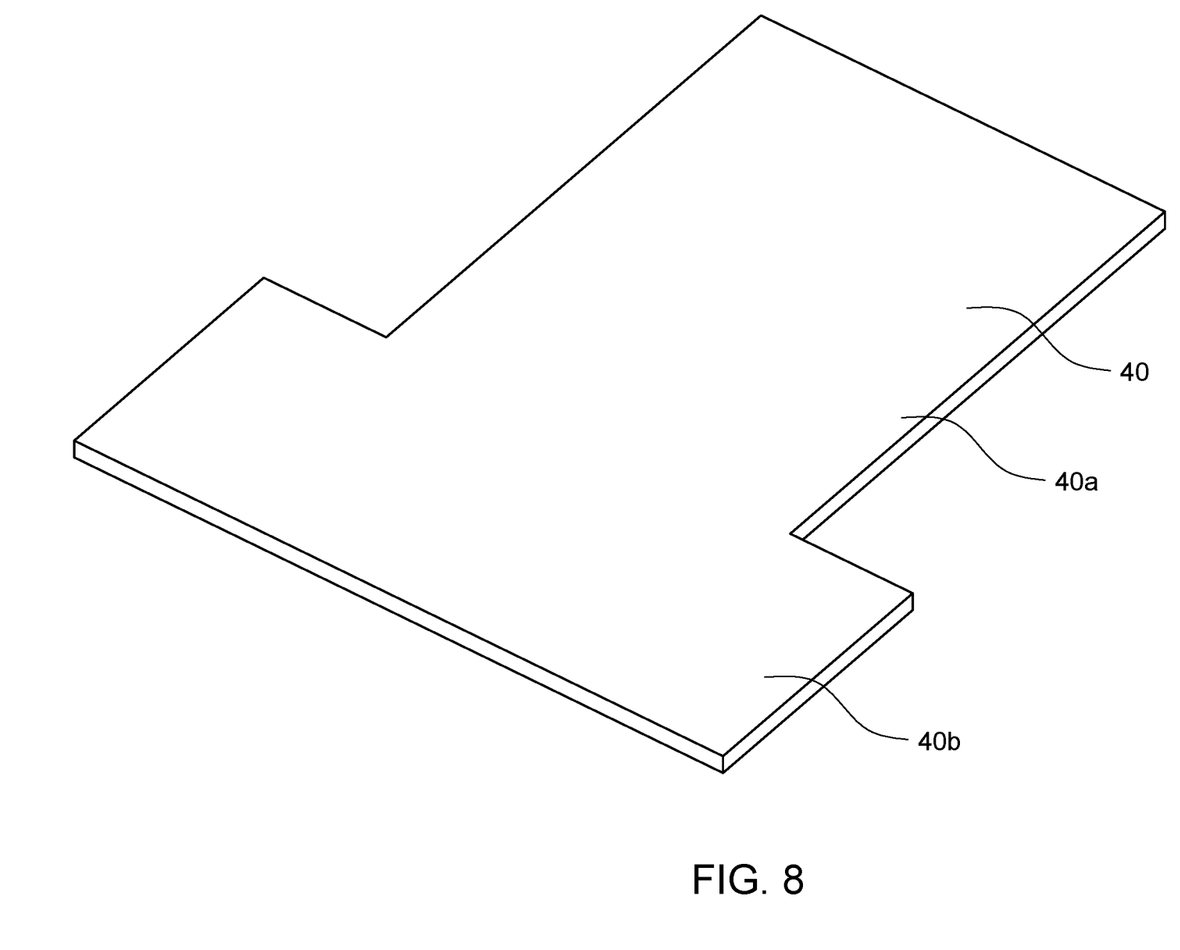
FIG. 8 represents a perspective view of mat 40.

In operation, as illustrated in FIG. 1, back doors 30a of vehicle 30 is opened and mat 40 which is deep inside storage area 20 of vehicle 30 and cargo is positioned on mat 40 inside. In FIG. 2, the at least one rear longitudinal member 70 can be pulled too so that mat 40 slides out on back door 30a. In FIG. 3, above horizontal portion 40b of T-shape hangs down from back door 30a so that cargo moves out and can be easily removed. Once done, mat 40 needs to be rolled and at least one front longitudinal member 50, rear and front cross members 60a and 60b and at least one rear longitudinal member 70 can be pulled out to be dismantled. As illustrated in FIG. 4, at least one front longitudinal member 50, rear and front cross members 60a and 60b and at least one rear longitudinal member 70 are arranged in a compact form. As illustrated in FIG. 5, mat 40 is rolled over at least one front longitudinal member 50, rear and front cross members 60a and 60b and at least one rear longitudinal member 70 so that hook and loop fastener 90 maintains mat 40 in rolled position to achieve compact form. In rolled position, mat 40 along with at least one front longitudinal member 50, rear and front cross members 60a and 60b and at least one rear longitudinal member 70 can be positioned anywhere. When again required, the mat 40 can be unrolled and at least one front longitudinal member 50, rear and front cross members 60a and 60b and at least one rear longitudinal member 70 can be attached to mat 40 as desired and cargos can be loaded and at least one rear longitudinal member 70 can be pushed inside storage area 20. Thus, cargo loading and unloading system 10 is easy to use, can be converted to a compact form and eases loading and unloading. Rear longitudinal member 70 can serve as handles to pull the mat in and out.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cargo loading and unloading system for a vehicle, said system comprising:
   a. a mat having a front side and a rear side;
   b. at least one cross member;
   c. at least one front longitudinal member;
   d. at least one rear longitudinal member;
   e. said at least one cross member located between said at least one front longitudinal member and said at least one rear longitudinal member;
   f. said at least one cross member and said at least one front longitudinal member and said at least one rear longitudinal member being mounted to said mat; and
   g. said mat positioned within a cargo area, hook and loop fasteners or snap buttons are used to adhere and detach said at least one front longitudinal member, said at least one rear longitudinal member, and said at least one cross member to and from said mat.

2. The system of claim 1 wherein said cargo area is between two lateral side walls, said at least one cross member extends towards and is adjacent to said two lateral side walls.

3. The system of claim 2 wherein said cargo area includes a wheel well protrusion on each of said two lateral side walls, wherein said at least one cross member includes a front cross member and a rear cross member, said rear cross member has a width greater than said front cross member's width to overcome said wheel well protrusion when sliding out.

4. The system of claim 1 further including a front cross member mounted to said at least one front longitudinal member.

5. The system of claim 1 further including a rear cross member mounted to said at least one rear longitudinal member.

6. The system of claim 1 wherein said at least one cross member is a front cross member positioned horizontally on said mat.

7. The system of claim 1 wherein said at least one cross member is a rear cross member positioned horizontally on said mat.

8. The system of claim 1 wherein holes are located at the rear of said mat and are adapted to serve as handles for the user.

* * * * *